United States Patent [19]

Le Pargneux

[11] 4,448,561
[45] May 15, 1984

[54] SCREWED SAFETY ASSEMBLY

[75] Inventor: Jacques Le Pargneux, Lyons, France

[73] Assignee: Framatome, Courbevoie, France

[21] Appl. No.: 183,563

[22] Filed: Aug. 29, 1980

[30] Foreign Application Priority Data

Sep. 19, 1979 [FR] France ............................... 79 23312

[51] Int. Cl.³ ............................................. F16B 35/04
[52] U.S. Cl. ...................................... 403/19; 403/21; 411/176
[58] Field of Search ............... 411/166, 169, 176, 181, 411/183; 403/19, 21, 22; 72/359, 479; 29/523

[56] References Cited

U.S. PATENT DOCUMENTS

| 1,344,964 | 6/1920 | Russell | 29/157 C |
|---|---|---|---|
| 1,521,805 | 1/1925 | Ellis | 72/479 |
| 2,255,649 | 9/1941 | Burke | 411/176 |
| 2,377,114 | 5/1945 | Tomalis | 411/176 X |
| 2,740,327 | 4/1956 | Stegeman | 411/176 X |
| 2,851,292 | 9/1958 | McClain | 411/176 |
| 3,091,842 | 6/1963 | Creamer | 411/176 X |
| 3,319,690 | 5/1967 | Rosan et al. | 29/523 |
| 3,371,402 | 3/1968 | Neuschotz | 29/523 X |
| 4,139,315 | 2/1979 | Levy et al. | 411/176 X |

FOREIGN PATENT DOCUMENTS

| 2368785 | 5/1978 | France | 411/176 |
|---|---|---|---|
| 100783 | 9/1962 | Norway | 29/523 |

Primary Examiner—Thomas J. Holko
Attorney, Agent, or Firm—Pollock, Vande Sande & Priddy

[57] ABSTRACT

A screwed safety assembly capable of being assembled and disassembled at a distance and under immersion, in which the screw head comprises a deformable cylindrical ferrule (15) and in which the seating (4) of the screw head comprises widened portions (6) into which the ferrule partially penetrates when it is deformed by expansion. The seating (4) of the screw head further comprises, at the level of the upper edge of the ferrule (15), a circular groove (10) between the widened portions (6) and leading into these.

1 Claim, 7 Drawing Figures

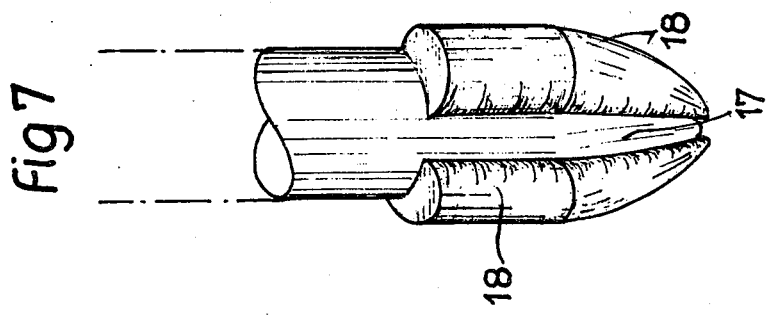
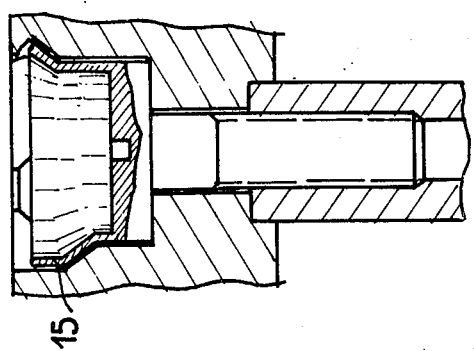
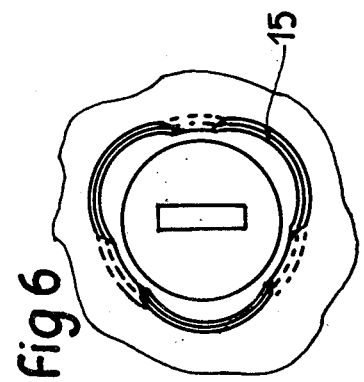
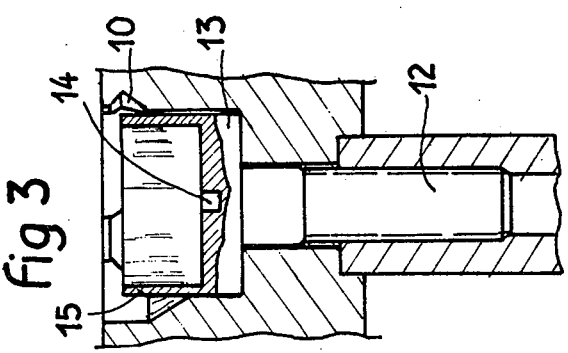
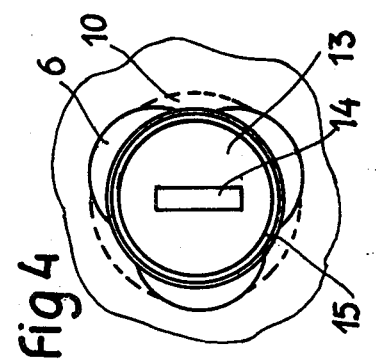
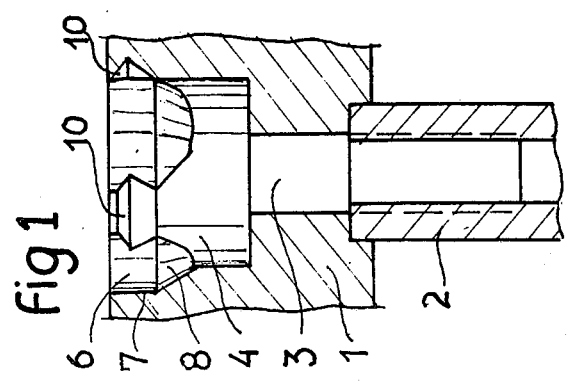
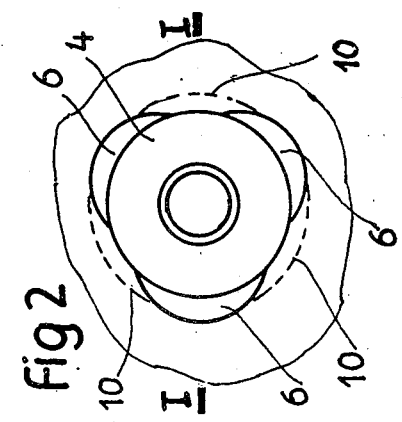

SCREWED SAFETY ASSEMBLY

FIELD OF THE INVENTION

The present invention relates to a screwed safety assembly, preventing the loss of the screw head in the event of fracture, and intended more particularly, by way of example, for the connection between the guide tubes and the end members in the fuel assemblies of nuclear reactors.

BACKGROUND OF THE INVENTION

In the core of a nuclear reactor, the rods or "pencils" of combustible material are generally regrouped in parallel in bundles or assemblies comprising end members and intermediate supporting grids maintaining the spacing of the rods. Supporting tubes or guide tubes directly connect the end members, in places taking the place of rods in the intermediate supporting grids.

The operation of the reactor involves the possibility of replacing or checking certain rods, which makes it necessary to dismantle the assemblies, an operation which is carried out under immersion in a great depth of water for protection against radiation.

The problem therefore consists in enabling the connection of the end members to the guide tubes to be sufficiently easy to dismantle to be operable at a distance and under immersion, and at the same time to be sufficiently reliable to avoid any risk of release of the connection through untimely unscrewing, and above all any risk of having the connecting members separate from the assembly and being entrained in the circuit of the primary cooling fluid of the reactor.

A solution has already been proposed in applicant's French Pat. No. 76-31554, published under No. 2.368.785, and describing a screw connection which can therefore be easily maneuvered at a distance, with a device for locking in rotation by deformation of a thin element of the screw head to engage it in a recess in the end member, an operation which is likewise easy to carry out at a distance. This arrangement does in fact render it possible to prevent the accidental unscrewing of the screw and its loss in the primary circuit. Nevertheless, it leaves a risk in the case of an accidental fracture of the screw, particularly if this fracture takes place in the relatively more fragile connecting region between the head and the threaded shank. In such case, in fact, the head would become entirely free and could therefore leave its seating and become an uncontrolled foreign body in the core of the reactor and in the primary circuit. This applies, in particular, to the case of the screws connecting the guide tubes to the lower end members when the assembly is in position in the core.

SUMMARY OF THE INVENTION

The present invention constitutes an improvement to the previous solution and enables the screw head to be kept captive, both in rotation to avoid the unscrewing, and at the same time axially to avoid its displacement in case of fracture.

The invention therefore relates to a screwed safety assembly, comprising a screw, the head of which is engaged in a smooth seating in the first part to be assembled and the threaded shank of which is engaged in the interacting threaded portion of the second part to be assembled, in which assembly the head of the screw comprises a deformable portion consisting of a thin external cylindrical ferrule, and in which the seating of the screw head comprises, on one portion only of its periphery, at least one widened portion of larger diameter into which penetrates a corresponding portion of the deformable ferrule when this is deformed by expansion. According to the invention, the seating of the screw head also comprises a circular groove formed at the level of the upper edge of the deformable ferrule, between the widened portions and leading into these, in such a manner that, on deformation by expansion of the ferrule, at least a portion of the upper edge penetrates into the groove between the widened portions.

BRIEF DESCRIPTION OF THE DRAWINGS

The invention will be better understood with reference to a particular form of embodiment given by way of example and illustrated in the accompanying drawings.

FIGS. 1 and 2 represent, respectively in diametral section on along lines I—I of FIG. 2, and in plan view, the assembly of the two parts to be assembled, before the connecting screw is placed in position.

FIGS. 3 and 4, respectively similar to FIGS. 1 and 2, show the connecting screw in position, screwed home but before locking.

FIGS. 5 and 6 show the assembly in the same manner after locking of the screw.

FIG. 7 shows an example of a tool which can be used to assure the locking of the connecting screw.

DETAILED DESCRIPTION

Referring first to FIGS. 1 and 2, the two parts 1 and 2 to be assembled are seen, part 1 being for example, an end member of an assembly of fuel rods for a reactor, and the part 2 a guide tube to stiffen and support the assembly. The end of the guide tube 2 is here engaged in an interacting seating in the part 1, preferably with a prismatic contour to prevent the rotation of the tube in its seating. In the axis of the tube 2, the part 1 is pierced by a smooth hole 3, then with a cylindrical seating of larger diameter 4. The seating 4 comprises, likewise distributed angularly about the axis, three widened-out portions 6 each formed by a portion 7 with a wall parallel to the axis of the assembly, connected to the seating 4 by a conical portion 8.

In the upper portion of the seating 4, a circular groove 10 with a triangular section is formed between the widened portions 6 and leads into each of these.

Referring now to FIGS. 3 and 4, the connecting screw 12 is seen screwed home in the threaded end portion of the tube 2; it thus holds the assembly where the end of the tube 2 comes into abutment at the bottom of its seating in the part 1, while the internal face of the screw head comes to bear against the shoulder formed between the smooth hole 3 and the seating 4.

In a similar manner to that described in French Pat. No. 76-31554, the head of the screw 12 comprises a solid portion 13 having a slot 14 adapted to receive a screwdriver blade, and a deformable portion consisting of a thin ferrule 15.

Once the screw has been screwed home by means of a screwdriver, its locking against both rotation and axial movement is achieved by means of a tool 17 like that illustrated in FIG. 7. Like the tightening screwdriver, the tool 17 may be mounted at the end of a pole when the operation is carried out at a distance, under immersion. The tool 17 comprises three projecting lobes 18, equidistant angularly, and of a shape substantially matching that of the widened portions 6 of the seating of the screw head.

The tool 17 is brought into the axis of the assembly and into such an angular position that the lobes 18 face the widened portions 6. Through an axial thrust of the tool, the lobes 18 cause the expansion of the corresponding portions of the ferrule 15 and deform them until they come into abutment against the conical portions 8 and straight portions 7 of the widened portions. FIGS. 5 and 6 show the result of such a deformation which is sufficient to prevent the subsequent rotation of the screw and its unscrewing, and it may be noted that this is achieved by means of an extremely simple tool which does not comprise any moving part.

Facing the three regions which have remained cylindrical as a whole between the three widened portions, there is no protuberance of the tool 17 and therefore there is no direct expansion of the ferrule 15. But the deformation in the region of the widened portions reacts indirectly, at least on the upper portion of the ferrule, so that in these intermediate regions, the upper edge of the ferrule penetrates slightly into the groove 10. This is sufficient to make the head captive, by three arresting points, in the event of a fracture of the screw outside the threaded region, detaching the head from the rest of the screw. Thus an additional degree of safety is obtained in the operation of the reactor.

In order to dismantle the assembly, it is sufficient to engage a screwdriver blade in the slot 14 again and to turn the screw normally in the unscrewing direction. When the rotational torque is sufficient, the parts previously expanded are bent towards the center passing in front of the seating portions 4 of wall which have remained straight, and through the effect of proximity, this bending of the widely expanded parts is sufficient to bend also the parts which were only very slightly expanded in the groove 10. The assembly is thus rendered entirely free for rotation and axially for a complete unscrewing and dismantling of the fuel assembly.

The invention is not strictly limited to the embodiment which has just been described, but also covers embodiments which only differ in details, in modifications of execution, or by the use of equivalent means.

Thus, the solid screw could be replaced by a hollow sleeve permitting, in the case of a fuel assembly, the passage inside the guide tubes of the absorbing rods adapted to control the reactivity of the core of the reactor. Similarly, the screwdriver slot could be replaced by any other conventional device for driving in rotation, such as a square or hexagonal blind hole.

Moreover, the number of widened portions formed all round the seating of the screw head is not necessarily three, and a single one might even be sufficient to obtain the locking in rotation, while a secondary widened portion of the ferrule would be formed at its two ends, thus creating two axial locking points.

Finally, the invention is not limited to the dismountable connection of the end members of the guide tubes of fuel assemblies of nuclear reactors, but likewise covers similar embodiments for all screwed assemblies requiring the same degree of safety has against the risk of loss of the screw head in the event of fracture.

I claim:

1. A screwed safety assembly for an easily dismountable assembly of a nuclear reactor, comprising a screw (12) the head (13) of which engages in a smooth seating (4) in a first part to be assembled (1), and the threaded shank of which engages a mating threaded portion of a second part to be assembled (2), said head of said screw comprising a deformable portion consisting of a thin external cylindrical ferrule (15), and said seating (4) of said screw head comprising, over a portion only of its periphery, at least one widened portion (6) of larger diameter into which a corresponding portion of said deformable ferrule (15) penetrates upon being deformed by expansion, said seating (4) of said screw head also comprising a circular groove (10) formed at the level of the upper edge of said deformable ferrule (15) between said at least one widened portion (6) and leading thereinto, in such manner that, when said ferrule is deformed by expansion, at least a portion of said upper edge penetrates into said groove (10) between said at least one widened portion (6), whereby said head (13) of said screw (12) is retained in said seating (4) in the event of fracture of said screw (12), the deformability of said ferrule (15) being sufficient to permit disengagement of said assembly merely by unscrewing, the portions of said ferrule (15) which were expanded then being deformed in the opposite direction.

* * * * *